United States Patent [19]

Barbeau et al.

[11] 3,852,820

[45] Dec. 3, 1974

[54] STABILIZATION OF PARTITIONABLE MEMORY WITH FLEXIBLE ROTATING DISCS

[75] Inventors: Raymond A. Barbeau; Bernard W. McGinnis; Frederick A. Schultz, all of Poughkeepsie, N.Y.

[73] Assignee: International Business Machines Corporation, Armonk, N.Y.

[22] Filed: July 2, 1973

[21] Appl. No.: 375,988

[52] U.S. Cl. .................................................. 360/99
[51] Int. Cl. .......................................... G11b 15/00
[58] Field of Search ...................................... 360/99

[56] References Cited

UNITED STATES PATENTS

| | | | |
|---|---|---|---|
| 3,225,338 | 12/1965 | Kelner et al. | 340/174.1 E |
| 3,703,713 | 11/1972 | Pohm et al. | 340/174.1 E |
| 3,731,292 | 5/1973 | Kelley | 340/174.1 E |

*Primary Examiner*—Vincent P. Canney
*Attorney, Agent, or Firm*—Robert Lieber

[57] ABSTRACT

A random access memory with closely spaced ultra-thin continuously rotating flexible magnetic discs is stabilized while being partitioned by an airfoil blade. A shroud member having the form of a section of a cylinder controls air flow within and around the discs under steady state and disturbed conditions. A rigid reference plate controls air flow relative to one end of the disc aggregate. Flexible washer discs having varied diameters, retain the other end of the aggregate and operate as a variable rate spring to damp fluttering movements of the discs caused by operation of the partitioning mechanism. The hollow partitioning blade is adapted to supply slightly pressurized air between an external source and the partition interface. The air is emitted at a critical predetermined angle relative to the interfacing discs and directed at an angle to the entrained air flow within the interface. This serves to stabilize the discs which are not displaced by the blade but which have a tendency to flutter due to the turbulence produced by the partitioning action.

16 Claims, 21 Drawing Figures

FIG. 8
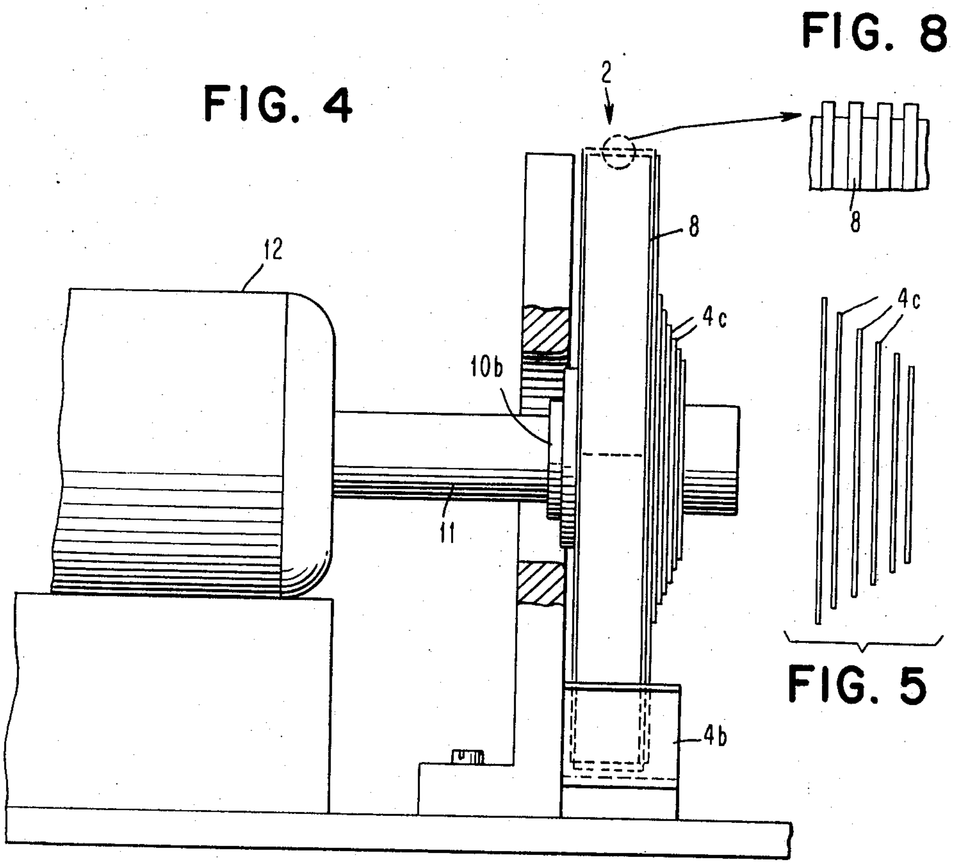
FIG. 4, FIG. 5
FIG. 6
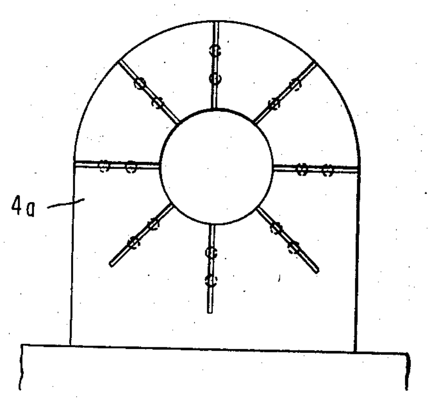
FIG. 7
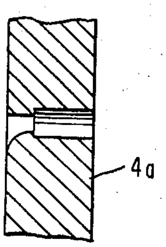

STABILIZATION OF PARTITIONABLE MEMORY WITH FLEXIBLE ROTATING DISCS

CROSS REFERENCES TO RELATED APPLICATIONS

The following co-pending patent applications filed simultaneously herewith disclose related subject matter and relevant portions of their disclosures are intended to be incorporated herein by this and subsequent references:

1. Application Ser. No. 375,989 filed July 2, 1973 by R. A. Barbeau, B. W. McGinnis, A. W. Orlando, J. A. Weidenhammer entitled "Partitionable Disc Memory With Flexible Discs And Conformally Suspended Head."

2. Application Ser. No. 375,989, filed July 2, 1973 by R. A. Barbeau, B. W. McGinnis, J. A. Weidenhammer entitled "Aerodynamic Partitioning Mechanism For Random Access Memory With Flexible Rotating Discs."

3. Application Ser. No. 375,985, filed July 2, 1973 by R. O. Cobb and J. Lipp, entitled "Edge Locating Apparatus."

BACKGROUND OF THE INVENTION

1. Field of the Invention

Multi-disc rotating memories for random access mass storage; wherein confined recording surfaces of continually rotating flexible magnetic discs in a dense laminar array are rendered accessible by flexure at randomly selected interfaces creating work spaces at said interfaces suitable for accommodating a transducer.

2. Prior Art

U.S. Pat. Nos. 3,509,553, 3,618,055 and 3,703,713 disclose laminar flexible disc storage organizations wherein individual flexible discs rotating about a horizontally oriented axis are rendered accessible while rotating by operation of a combined partitioning and transducing mechanism. The partitioning mechanism comprises a rigidly mounted slotted guide structure which isolates the selected disc and displaces all other discs. The transducer is incorporated in the guide structure and cooperates with the facing surface of the selected disc. A potential problem with this type of structure is the difficulty of engaging and guiding the desired disc when the discs are ultra-thin and the aggregate is rotating at high speeds suitable for fast access quality reproduction of densely stored signals. Stressing and tearing of the discs is an ever-present possibility.

Lynott et al, *IBM Technical Disclosure Bulletin*, Volume 12, No. 1, June 1969, Page 81, describes access partitioning of flexible discs rotating about a vertical axis in a laminar organization without isolation of individual discs. A probe operates to displace the path of rotation of a segment of the flexible aggregate at a randomly selected interface position. A separately mounted transducer is positioned in the partition space formed by the probe adjacent to the facing surface of the complementary undisplaced disc segment. A difficulty with this type of organization is that the stability of the undisplaced discs is affected by the turbulence created by the partitioning action presenting problems of establishing the transducer in operating position without interference from the undeflected discs, of maintaining stable conformal relation between the transducer and the facing record surface, and of limiting wear stresses imposed on the discs by the partitioning probe and transducer. These problems are addressed and significantly reduced or eliminated by the present invention.

SUMMARY OF THE PRESENT INVENTION

By means of presently described expedients a laminar array of flexible discs in an organization generically resembling the Lynott et al organization — but with specialized partitioning and transducing elements, with the rotational axis horizontal rather than vertical and with ultra-thin discs — is adapted for stable operation. Deflected and undeflected discs are rapidly stabilized following partitioning disturbance. The resiliently suspended low mass transducer thereby can be maneuvered into the partition opening formed by the partitioning blade without interference from the undeflected discs. Due to its airfoil design the blade supports the discs on a hydrodynamically generated air bearing, thereby avoiding contact after insertion.

The foregoing and other features, objectives and characteristics of the subject invention will be more completely understood and appreciated from the following detailed description and claims.

BRIEF DESCRIPTION OF THE DRAWINGS

FIGS. 4–7 illustrate the disc sub-assembly and motion stabilizing elements associated therewith.

FIG. 8 illustrates a detail of the disc edges in FIG. 4 showing the use of alternately varied disc diameters to provide edge delineation for access location and edge separation to facilitate accurate blade insertion.

DETAILED DESCRIPTION

Apparatus Configuration

Following is a description of apparatus embodying the subject invention with relevant details of construction and operation of the partitioning and stabilizing elements. Details of other elements not relevant to the operation of the subject invention, for instance the particulars of the transducer assembly, are found in the above cross-referenced patent applications.

Referring to FIGS. 1–8 subject apparatus comprises disc pack sub-assembly 2, stabilizing members 4a, 4b and 4c and access sub-assembly 6.

Figure 3:
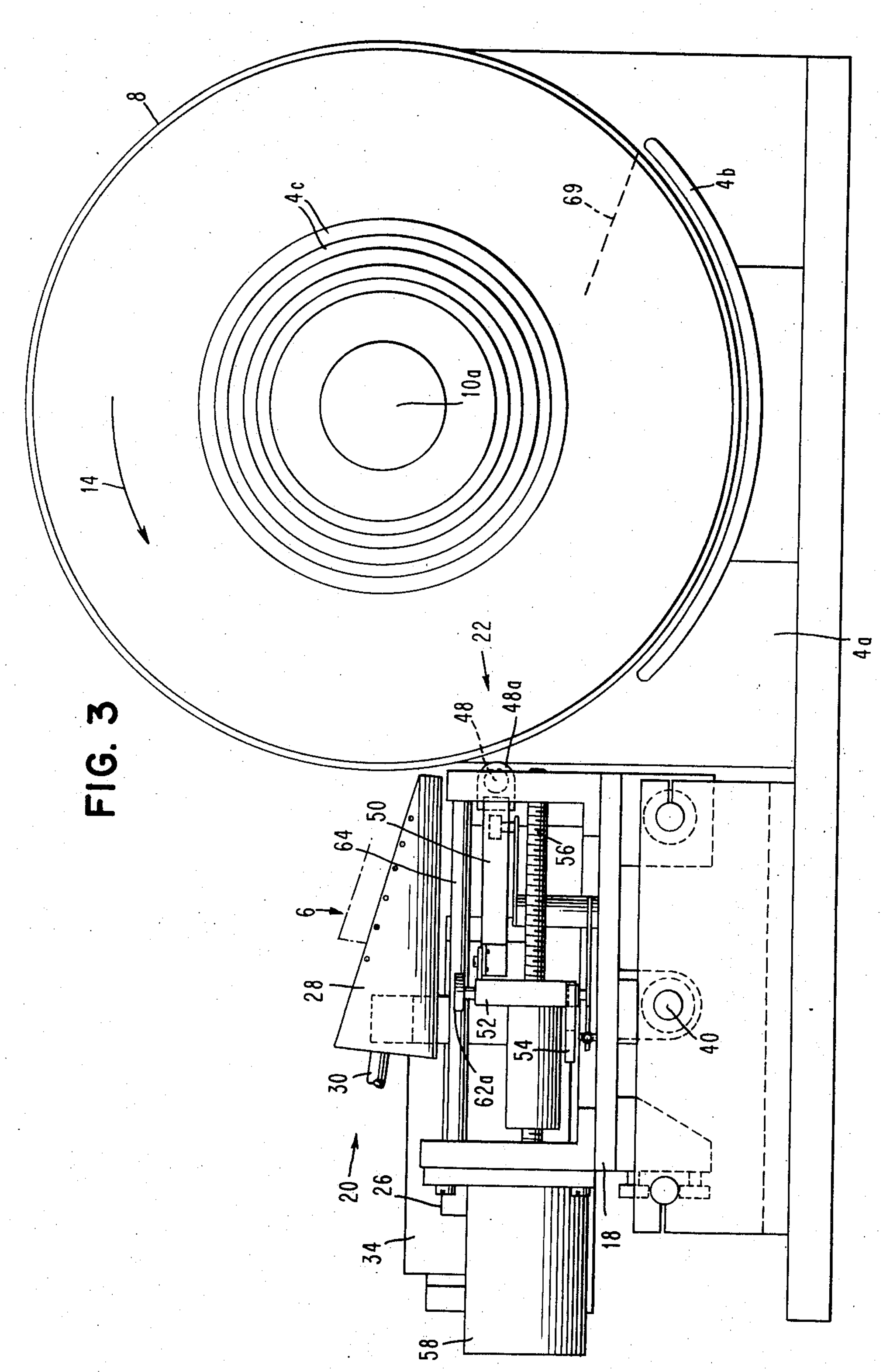

Disc Sub-assembly disc aggregate 2 comprises several hundred ultra-thin (nominal thickness 0.0017 inches) flexible disc-shaped magnetic record foils 8 secured by clamps 10a,10b (FIG. 4) to a generally horizontal spindle which threads into shaft 11. The shaft is driven by motor 12 (FIG. 4). The discs have nominal diameters of 12 inches; alternate discs being shortened slightly to 11.7 inches diameter (FIG. 5) to provide for edge discrimination by not shown edge locating apparatus. The foils are cut from webs of magnetic oxide coated mylar (mylar thickness in inches approximately 0.0015; oxide coating thickness approximately 0.0002). Shaft 11 is rotated by motor 12 continuously at high speed (approximately 1800 rpm) in the direction indicated by arrow 14 (FIG. 3).

Access Sub-assembly (FIGS. 1–3, 6–8)

Access sub-assembly 6 comprises carriage 18, partitioning sub-assembly 20, transducing sub-assembly 22 and a not shown edge locating sub-assembly. The edge locating sub-assembly forms no part of the present invention and may be either of conventional construction, as described in the prior art references cited above, or of specialized improved construction as described in above cross-referenced co-pending patent application by R. Cobb and J. Lipp.

Partitioning Sub-assembly

Figure 9:
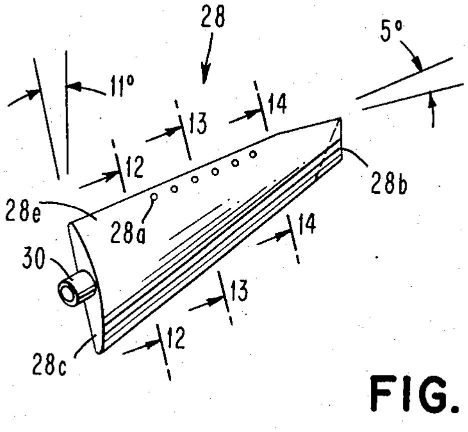
FIGS. 9–11 provide several perspective and elevational views of the subject partitioning blade.
Figure 10:
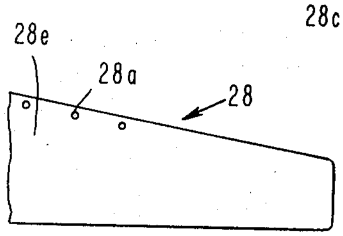
Figure 11:
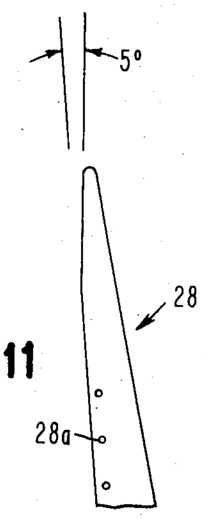
Figure 13:
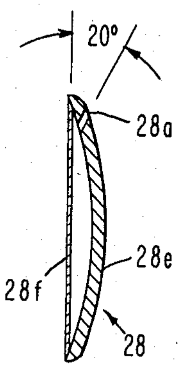
FIGS. 12–14 are sectional views of the blade mechanism taken along lines indicated in FIG. 9.

Partitioning sub-assembly 20 comprises shaft 24 secured to carriage 18, carrier 26 slideable on shaft 24, and air foil blade 28 secured rigidly to carrier 26. Blade 28 contains hollow passages 28a (FIGS. 9–11). These connect with tube 30 to conduct air under slight pressure, into partition opening spaces formed by the blade, with pack stabilization effects discussed later. Carriage 18 is movable longitudinally parallel to the rotational axis of discs 8 by rotation screw 40; the latter rotation causable by not shown motive means. Carrier 26 is movable obliquely relative to the axis of the discs 8 by means of actuation of piston rod 32 from pneumatic chamber 34. Admission of air under pressure to chamber 34 via tube 36 thrusts piston rod 32 outwardly extending blade 28 obliquely into contact with the rotating discs at a randomly selected interface of the aggregate laminar array. This partitions the path of revolution of the discs at the selected interface into discretely separated rotating segments which diverge and converge around the blade forming a sizable opening suitable for transducing access. Release of air from chamber 34 permits rod 32 to return, under the influence of a not shown spring, to a retracted position in which the blade is removed from partitioning engagement with the pack. In this position screw 40 is permitted to drive carriage 18 in traverse, under control of the above-mentioned edge locating assembly, to align blade 28 with another randomly selected disc interface whereupon the partitioning process may be repeated. The contours and motion of the blade, and damping effects of stabilizing elements discussed later, cause the partitioned pack to assume aerodynamically stable rotational configurations very shortly after initial contact with the blade (e.g., $200 \times 10^{-3}$ seconds).

Transducer Sub-assembly

Figure 1:
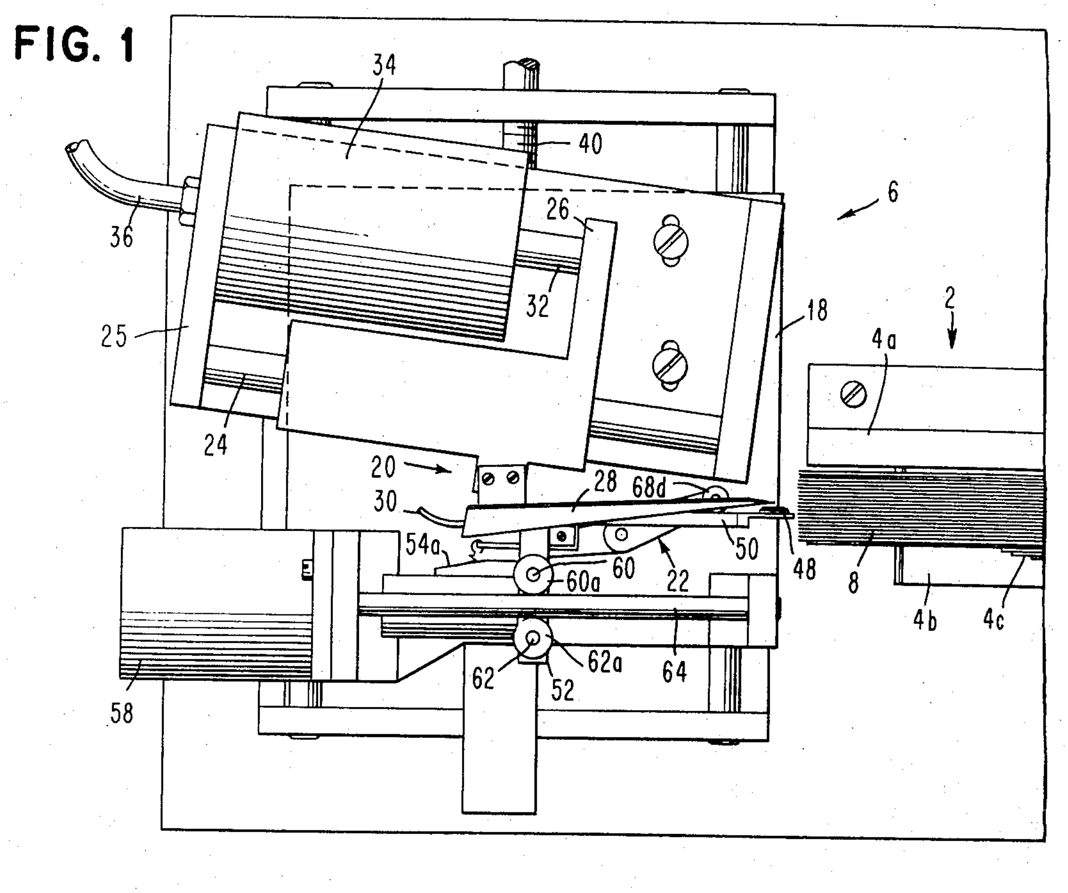
FIGS. 1–3 contain top, side and end elevational views of preferred apparatus incorporating the subject partitioning mechanism.
Figure 2:
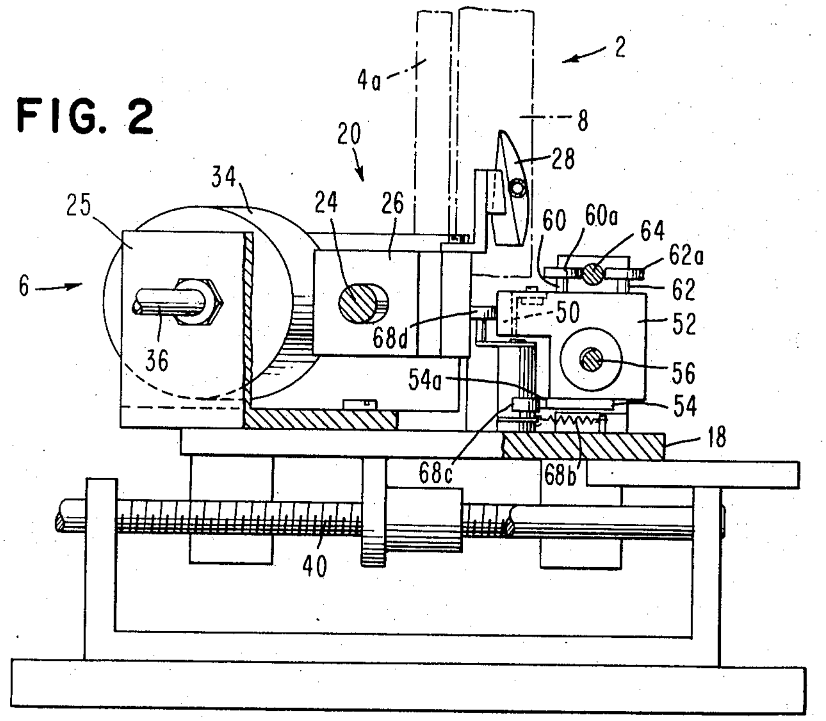

Sub-assembly 22 (FIGS. 1–3) comprises compound radius magnetic head 48 suspended on arm 50 comprising dual cantilevered beam springs. The remote ends of the spring in arm 50 are fastened via crosspiece 52 to movable baseplate 54. Carrier plate 54 is arranged to be translated by screw 56 perpendicular to the direction of movement of carriage 18. Thus, when screw 56 is rotated by step motor 58 the entire assembly 54, 52, 50, 48 translates perpendicular to the axis of the discs subject to constraints on arm 50 discussed next. As viewed in FIG. 1, the assembly is in an extreme withdrawn position relative to the discs. The axial position of part 52 is such that in the absence of constraints on arm 50 (i.e. if the arm were allowed to extend linearly toward the discs) if the head were advanced toward the discs it would encounter the undeflected discs (the discs to the left of the blade tip as viewed in FIG. 2). However rotatable bellcrank assembly 68 partially viewable in FIG. 2 is held by camming surface 54a of plate 54 in a position in which one of its rollers 68d bends arm 50 and head 48 away from the path of rotation of the undeflected discs (i.e., toward the right as viewed in FIG. 2 or downwardly as viewed in FIG. 1). But when plate 54 is moved toward the discs, by action of screw 56 and step motor 58, a descending slope in cam surface 54a is followed by another roller of bell-crank assembly 68 enabling the bell-crank assembly to rotate under the influence of spring 68b and thereby enabling roller 68d to move out of interferring position partitioned discs, to pivot toward the undeflected discs. With predetermined tension on arm 50, due to the axial position of part 52, the head assumes stable conformal air lubricated gliding relation to the nearest undeflected disc surface; the latter surface dimpling concavely at its rotational interface with the head in conformance with the convex contours of the head.

Operation of Apparatus

Figure 14:
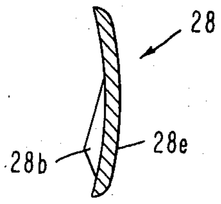
Figure 12:
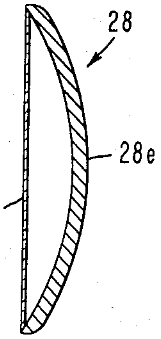
Figure 15:
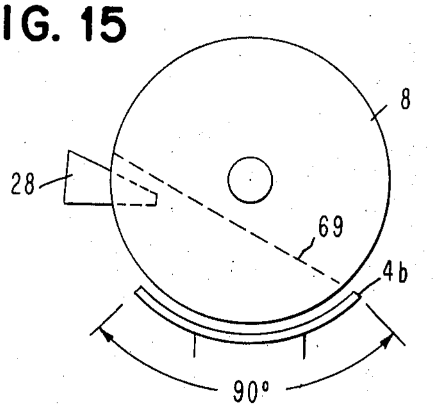
FIGS. 15–21 provide views of the partitioning blade and discs useful for explaining blade motion.
Figure 16:
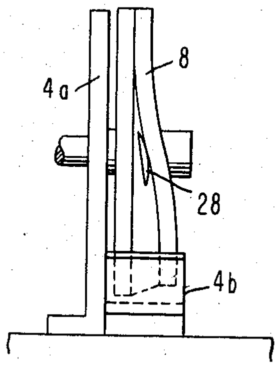
Figure 17:
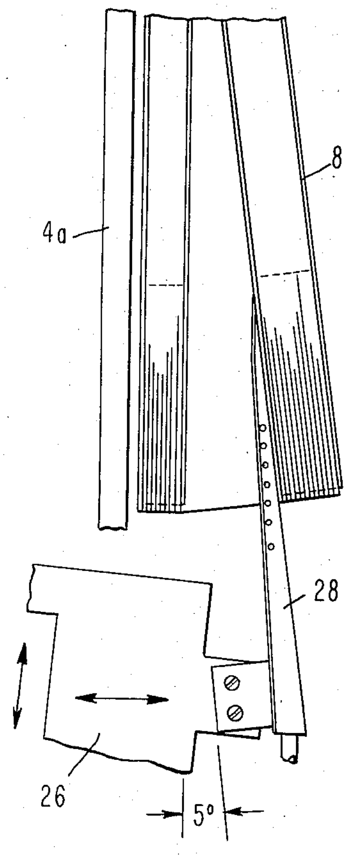
Figure 18:
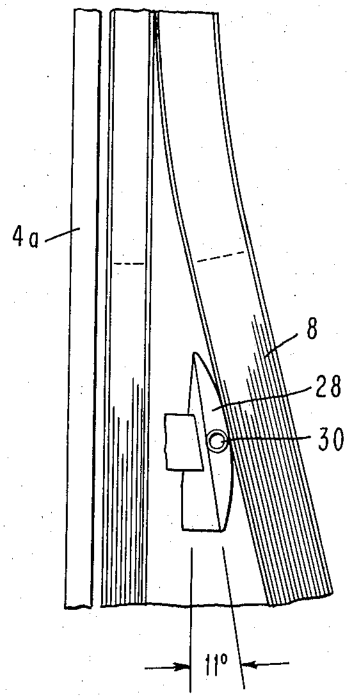

In operation sub-assemblies 20 and 22 are translated parallel to the rotational axis of the discs in retracted (withdrawn) position removed from the drum traced by the discs. Upon alignment of the tip of blade 28 with a desired randomly selected disc interface the path of rotation of the pack is partitioned by operation of assembly 20. Blade 28 is thrust deep into the rotational volume traced by the discs moving obliquely to one side (to the right as viewed in FIGS. 2, 14 and 15) until it aligns chord 69 (FIG. 3). The gradually varying camber of the blade contour facing the deflected discs (those displaced by the skewed motion) forms a supportive hydrodynamic air film relative to those discs while gradually extending the deflection to widen the space between deflected and undeflected disc segments. Due to operation of stabilizing elements discussed later, the partition configuration stabilize quickly with the deflected discs gliding smoothly around the blade and the undeflected discs resuming normal circular paths of revolution.

Upon stabilization of the partitioned discs, assembly 22 is actuated to extend shoe 48 radially into the partition space at first in a position of clearance relative to the undeflected discs and then, by action of cam 54a and assembly 68, pivotally towards the interfacing surface of the undeflected disc segment. This positions the head at a peripheral zone or track of the interfacing undeflected disc surface. As explained above, the pivotal tension on arm 50 is pre-adjusted to a predetermined condition enabling shoe 48 to form a stable complementary contour (dimple) in the facing disc surface with an intimately thin intervening lubricating air film between the shoe and the disc surface. The gliding (or flying) shoe then advances radially, by continued operation of motor 58, to a randomly selected track position.

Stabilization

Stabilization of the rotating pack after partitioning requires damping of components contributing to flutter and other unstable motion characteristics. A series of flexible "washer discs" 4c (FIGS. 4,5) operate relative to the deflected disc segment as a variable rate spring which damps the partitioning motion of the deflected discs (the discs deflected to the right as viewed in FIGS. 16-21). These "washers" have the following detailed configuration of thickness, compositional construction and diameter specified in the above cross-referenced application by: R. A. Barbeau, B. W. McGinnis, A. W. Orlando , J. A. Weidenhammer.

| Qty. | | Dia. |
|---|---|---|
| 1 — .125" | Thick Alum. | 3.75" |
| 2 — .0075" | do. Mylar | 3.87" |
| 2 — .0075" | do. | 4.12" |
| 1 — .0075" | do. | 4.25" |
| 1 — .0075" | do. | 4.50" |
| 1 — .0075" | do. | 4.62" |
| 1 — .0075" | do. | 4.75" |
| 1 — .0075" | do. | 5.12" |
| 1 — .0075" | do. | 5.94" |
| 1 — .0075" | do. | 11.75" |

Partial (open) shroud *4b* (FIGS. 3 and 4) subtends an arcuate portion of between 90° to 105° of the cylinder of rotation traced by the discs. The end of the shroud furthest from the blade is substantially in line with the upper edge of the fully inserted blade and coincident with the extension of chord 69 (FIG. 3). The length of the shroud parallel to the axis of rotation of the discs is sufficient to span all discs in the partitioned array and thereby receive the full air flow of the partitioned interface space. The shroud controls this air flow and limits the tendency of the deflected discs to flutter relative to blade 28.

Rigid reference plate 4a (FIGS. 2,4) serves to stabilize the aggregate disc motion. Grooves and connecting ducts in this plate (FIGS. 6,7) allow for the passage of entrapped air, between the plate and the nearest disc of the pack, with stabilizing effect. The plate can be either stationary as shown or mounted for rotation with the discs.

Slightly pressured air conducted thru the hollow interior of blade 28 passes thru openings 28*a* in the blade (FIGS. 9-14). This serves to modify the air flow within the confined space between partitioned disc segments in a manner tending to counteract (i.e., damp) an observed fluttering tendency of discs in the undeflected segment.

Thus, as blade 28 advances to its ultimate position of alignment with chord 69 (FIGS. 3,15) the paths of motion of the deflected discs are progressively deformed in conformance with and in compliant gliding relationship to the blade contours facing that segment while the motion of the deflected and undeflected discs due to partitioning turbulence quickly stabilizes so that the axial position and shape of the partition interface become sufficiently determinate to assure unobstructed passage of the transducing assembly.

Details of Partitioning Assembly and Operation (FIGS. 9-21)

As indicated in FIGS. 9-14, the contour of the blade from its engaging tip 28*b* to its opposite end 28*c* has continuously varied cross-sectional camber, permitting the blade to operate as an air foil while gradually deflecting and lubricatively supporting the partitioned pack. The openings 28*a* in the leading edge of the contoured face of the blade (relative to the entrapped air flow of the discs are suitably dimensioned at 0.030 inches diameter and suitably situated to conduct air (thru supply tube 30 and the hollow interior of the blade described later) between the partitioned discs at a critical angle of approximately 7° to 11° away from the rotational plane of the undeflected disc and towards the deflected disc. Carrier plate 26 supporting the blade moves at an oblique angle of between 4° and 11° relative to rotational plane of the undeflected disc. Observations indicate that foregoing air supply angle, blade slewing angle and blade contours, within stated range limits, are critical to effecting quickly stabilized partitioning, with minimum wear and tear stress on the selected discs.

The blade is a hollow structure formed by welding a contoured strip 28*e*, with openings 28*a* to flat end pieces 28*f*,28*c*. These strips and pieces may be made of plated brass or steel welded together as indicated. Piece 28c has opening fitted with supply coupling 30 for connection to the external air source.

Figure 19:
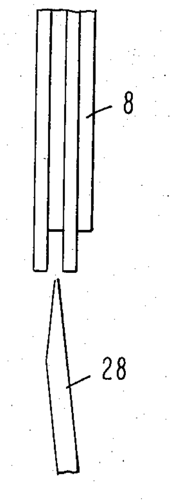
Figure 20:
Figure 21:
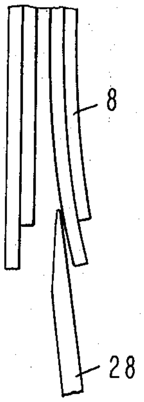

FIGS. 19-21 indicate that in the present apparatus embodiment, of discs with staggered diameters providing edge delineation for the locating assembly, the blade motion invariably causes deflection to the right of the larger diameter interfacing disc, thereby permitting the transducer assembly to operate consistantly on the shorter discs at the left.

While the invention has been particularly shown and described with reference to a preferred embodiment thereof, it will be understood by those skilled in the art that various changes in form and detail may be made therein without departing from the spirit and scope of the invention.

What is claimed is:

1. In a random access laminar disc file array, wherein rotating flexible discs in a laminar aggregate configuration are separated for transducing access by movement of a partitioning mechanism into a randomly selected interface between discs causing deformation of the path of rotation of a randomly selected segment of the laminar aggregate, improved stabilizing means comprising:

flexible motion stabilizing means connected to one axial end of the aggregate and subject to rotation and deformation with said segments upon operation of said partitioning mechanism;

rigid means positioned at the other axial end of the aggregate, opposite said one end, for maintaining a constant rotational reference for complementary disc segments whose rotational paths are undisturbed by the partitioning mechanism;

means bounding a portion of the circumferential path of revolution of the partitioned aggregate for reducing turbulence at said selected interface due to operation of said partitioning mechanism; and means incorporated in said partitioning mechanism for augmenting the airflow within the partitioned interface to stabilize the motion of the discs in the said complementary segments during operations of the partitioning mechanism.

2. In a random access laminar disc file array, wherein rotating flexible discs in a laminar aggregate configuration of multiple circular record discs are separated for transducing access by movement of a partitioning mechanism into a randomly selected interface between discs, causing deformation of the path of rotation of a randomly selected segment of the aggregate, improved stabilizing apparatus comprising:

means rotating coaxially with said discs and acting as a variable rate spring relative to said randomly selected segments for damping oscillatory components of the motion of the segment due to the action of said partitioning mechanism.

3. In a random access laminar disc file array, wherein rotating flexible discs in a laminar aggregate configuration of multiple circular record discs are separated for transducing access by movement of a partitioning mechanism into a randomly selected interface between discs, causing deformation of the path of rotation of a randomly selected segment of the aggregate, improvement comprising:

rigid means interfacing with and spanning the circular surface of revolution of one end of said aggregate for providing a positional reference and stabilizing surface in respect to the rotation of said aggregate.

4. In a random access laminar disc file array wherein rotating flexible discs in a laminar aggregate configuration of multiple circular records discs are separated for transducing access by movement of a partitioning mechanism into a randomly selected interface between discs causing deformation of the path of rotation of a segment of the aggregate, improvement comprising:

a shroud member positioned adjacent and conforming in shape to a section of the circumference of the cylindrical rotational path of said aggregate over an arcuate span of between 90° and 105° in the full rotational range of a complete revolution and extending over the entire axial length of the partitioned aggregate; said member being effective to control the turbulence within said interface due to operation of said partitioning mechanism without interfering with the operation of said partitioning mechanism or the transducing access associated therewith.

5. In a random access laminar disc file array wherein rotating flexible discs in a laminar aggregate configuration of multiple circular record discs are separated for transducing access by movement of a partitioning mechanism into a randomly selected interface between discs causing deformation of the path of rotation of a segment of the aggregate, improvement comprising:

means associated with said mechanism for augmenting the normal air flow within said interface upon operation of said mechanism in order to compensate for turbulence affecting the stability of discs which are not deflected by said mechanism.

6. In a random access laminar disc file array wherein rotating flexible discs in a laminar aggregate configuration of multiple circular record discs are separated for transducing access by movement of a partitioning mechanism into a randomly selected interface between discs, causing deformation of the path of rotation of a randomly selected segment of the aggregate, improved stabilizing apparatus comprising:

means rotating coaxially with said discs and acting as a variable rate spring relative to said randomly selected segments for damping oscillatory components of the motion of the segment due to the action of said partitioning mechanism, wherein said means comprises a series of flexible washer discs mounted at one end of the record disc aggregate and supported coaxially for rotation therewith; said washer discs having progressively decreasing diameters in the order of remoteness from the interfacing record disc at said one end; the largest washer diameter being about the same as the diameter of the smaller record discs.

7. Apparatus according to claim 6 wherein said record discs have diameters of approximately 12 inches with the washer discs having the following measurements and construction:

| Qty. | | Dia. |
|---|---|---|
| 1 — 54 | Thick Alum. | 3.75" |
| 2 — .0075" | do. Mylar | 3.87" |
| 2 — .0075" | do. | 4.12" |
| 1 — .0075" | do. | 4.25" |
| 1 — .0075" | do. | 4.50" |
| 1 — .0075" | do. | 4.62" |
| 1 — .0075" | do. | 4.75" |
| 1 — .0075" | do. | 5.12" |
| 1 — .0075" | do. | 5.94" |
| 1 — .0075" | do. | 11.75" |

8. In a random access laminar disc file array, wherein rotating flexible discs in a laminar aggregate configuration of multiple circular record discs are separated for transducing access by movement of a partitioning mechanism into a randomly selected interface between discs, causing deformation of the path of rotation of a randomly selected segment of the aggregate, improvement comprising:

rigid means interfacing with and spanning the circular surface of revolution of one end of said aggregate for providing a positional reference and stabilizing surface in respect to the rotation of said aggregate, wherein said means comprises a plate having grooves and through-holes at the interface thereof with the nearest record disc of the aggregate; said groves and holes allowing the air carried along by the rotation of the aggregate to circulate with stabilizing effect relative to said aggregate.

9. Apparatus according to claim 8 wherein said means is a stationary end plate having a central opening through which rotational impetus is coupled to the said aggregate.

10. Apparatus according to claim 9 wherein said grooves interface with and are radially oriented relative to the path of rotation of the record discs and said through holes extend between said grooves and the opposite face of said plate.

11. Apparatus according to claim 4 wherein said shroud member is an imperforate structure having the form of a cylindrical section extending lengthwise parallel to the axis of rotation of the record discs and spanning the edges of all record discs in the partitioned aggregate in a position removed from the zone of operation of said partitioning mechanism and associated means effecting said transducing access.

12. Apparatus according to claim 5 wherein said partitioning mechanism comprises a hollow blade having an air foil contoured surface interfacing with said deformed segments; said contoured surface having openings communicating with the hollow interior of the blade for conducting air between the selected partitioned interfaces of said disc aggregate and a space external to said blade and interface.

13. Apparatus according to claim 12 wherein said air is conducted from said external space to said interface.

14. Apparatus according to claim 12 wherein said air is lightly pressurized and specifically directed to augment the flow of air within said interface to effect said compensation for turbulence.

15. Apparatus according to claim 14 wherein said air is directed obliquely into the entrained air flow of the interface at an oblique inclination of about 9° away from the surface of revolution of the undeflected disc.

16. In a random access flexible disc storage file wherein a multiplicity of flexible storage discs arranged coaxially in a self-supporting laminar configuration are subjected to continuous rotation and to intermittent displacements at randomly selected lamination interfaces, said displacements serving to permit transducing access to storage surfaces confronting openings created by said displacements, the improvement comprising:

apparatus effective to quickly stabilize intermittent disc motions accompanying said displacements, whereby said discs quickly attain stable rotational orbits after each said displacement.

* * * * *